United States Patent [19]
Sillitto et al.

[11] Patent Number: 5,513,034
[45] Date of Patent: Apr. 30, 1996

[54] INFRARED OPTICAL SYSTEM

[75] Inventors: Hillary G. Sillitto, Mid Calder; Alison B. Lessels, Freuchie, both of United Kingdom; Evan S. Cameron, Penetanguishene, Canada; Thomas B. Wilson, Edinburgh, United Kingdom

[73] Assignee: GEC Marconi Avionics (Holdings) Limited, Middlesex, United Kingdom

[21] Appl. No.: 119,110

[22] PCT Filed: Mar. 18, 1992

[86] PCT No.: PCT/GB92/00486

§ 371 Date: Apr. 5, 1994

§ 102(e) Date: Apr. 5, 1994

[87] PCT Pub. No.: WO92/16864

PCT Pub. Date: Oct. 1, 1992

[30] Foreign Application Priority Data

Mar. 22, 1991 [GB] United Kingdom ............... 9106163

[51] Int. Cl.⁶ ................................. G02B 13/14; G02B 23/02
[52] U.S. Cl. ............................. 359/351; 359/353; 359/401
[58] Field of Search ................................. 359/351, 353, 359/355, 356, 401

[56] References Cited

U.S. PATENT DOCUMENTS

| | | | |
|---|---|---|---|
| 3,610,930 | 10/1971 | Lacy et al. | 359/351 |
| 3,813,552 | 5/1974 | Johnson | 359/401 |
| 3,918,813 | 11/1975 | Rossiter | 359/401 |
| 4,074,930 | 2/1978 | Folsom et al. | |
| 4,155,096 | 5/1979 | Thomas et al. | |
| 4,260,217 | 4/1981 | Traeger et al. | 359/353 |
| 4,266,873 | 5/1981 | Hacskaylo et al. | |
| 4,626,905 | 12/1986 | Schmidt | 359/351 |
| 4,630,900 | 12/1986 | Steiner | 359/401 |
| 4,636,044 | 1/1987 | Loy | 359/401 |
| 4,811,061 | 3/1989 | Sud et al. | |
| 5,157,548 | 10/1992 | Monnier et al. | 359/351 |
| 5,194,986 | 3/1993 | Carlson et al. | 359/353 |

FOREIGN PATENT DOCUMENTS

| | | |
|---|---|---|
| 0278929 | 8/1988 | European Pat. Off. . |
| 0367197 | 5/1990 | European Pat. Off. . |
| 0388603 | 9/1990 | European Pat. Off. . |
| 3329588 | 10/1984 | Germany . |
| 3931883 | 12/1990 | Germany . |
| 2211626 | 7/1989 | United Kingdom . |

*Primary Examiner*—Martin Lerner
*Attorney, Agent, or Firm*—Spencer & Frank

[57] ABSTRACT

An optical arrangement includes an infrared imaging system operating in conjunction with a first beam having wavelengths less than 15 microns, and a coherent infrared source generating a second beam having wavelengths shorter than the first beam wavelengths. Also provided is an objective lens arrangement including an objective lens having an aperture formed in one side of the objective lens. A partially reflective member is located between the objective lens arrangement, and the imaging system and infrared source. A T.V. camera is provided for receiving an image through the objective lens aperture. The first beam is directed to the imaging system from a region being imaged, and the second beam is directed from the infrared source to the region being imaged. The respective beams are directed to the partially reflective member so as to cause the respective beams to pass through the objective lens along substantially the same optical path as each other.

10 Claims, 2 Drawing Sheets

INFRARED OPTICAL SYSTEM

BACKGROUND OF THE INVENTION

The present invention relates to an infrared optical system for handling two infrared (I.R.) beams of differing wavelengths through the same objective lens.

Imaging systems have been proposed in which a target is illuminated by a coherent I.R. source while being simultaneously viewed by an I.R. imaging system. Where it is desired to reduce the size of the apparatus incorporating such a system, both the coherent source and the imaging system might share some optical components, especially in the objective region. Furthermore, size limitations can create problems in the positioning of the coherent source and imaging system for optimum performance.

SUMMARY OF THE INVENTION

The present invention has arisen in an attempt to provide a compact optical system including a coherent I.R. source and an I.R. imaging system.

In accordance with the present invention there is provided an optical arrangement comprising, an I.R. imaging system operating at wavelengths less than 15 microns, a coherent I.R. source of shorter wavelength than said imaging system, a partially reflective member and an objective lens arrangement, the beams to the imaging system and from the source being directed to the partially reflective means which is disposed between the objective lens arrangement and the imaging system and source so as to cause the beams to pass through the objective lens along substantially the same optical path; and a T.V. camera which co-operates with an aperture formed in the side of the objective lens.

It is preferred that the partially reflective means is a beam splitter which transmits the imaging system wavelengths and reflects the coherent beam wavelengths along the optical path.

The objective lens is ideally capable of transmitting I.R. radiation in the range of 0.5 to 15 microns. The I.R. imaging system typically operates at a wavelength of 3–5 or 8–12 microns and the coherent source typically has a wavelength of around 1 micron.

The objective lens conveniently allows achromatic focusing at the imaging system wavelengths and transmission of the coherent source wavelengths.

The coherent source is typically a Nd:YAG laser.

It is preferred that the imaging system includes a zoom lens arrangement to assist in focusing, and an optical derotation arrangement to reduce the effect of movement of the apparatus. The optical derotation arrangement is conveniently a prism.

Preferably, the arrangement includes a controllable mirror after the objective lens arrangement.

The invention will now be described by way of example, with reference to the accompanying drawings.

DETAILED DESCRIPTION OF THE INVENTION

Figure 1:
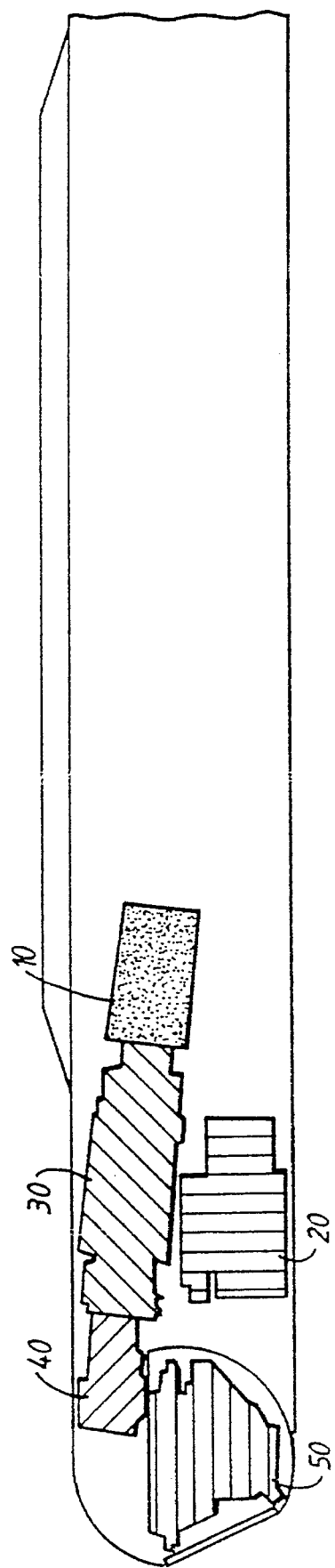
FIG. 1 shows a schematic partial side view of a device incorporating one embodiment of the invention.

Referring now to FIG. 1, the device shown therein comprises a pod for mounting externally on a vehicle such as an aircraft. The pod provides an infrared imaging system to the vehicle. In such cases, it is desirable to reduce the frontal area of the pod to a minimum to reduce air resistance. In the present case, the diameter of the pod is in the order of 300 mm. With such size restrictions, the positioning of components must be selected carefully in view of problems which can be encountered with excess optical path lengths and focusing restraints.

The apparatus shown comprises an I.R. imager 10, a Nd:YAG laser 20, an imager telescope 30, combining optics 40 and objective lens arrangement 50.

The I.R. imager 10 can be any proprietary system having suitable performance at wavelengths below 15 microns and suitable size, e.g. the class II thermal imaging common module scanner made by G.E.C. plc.

The Nd:YAG laser 20 is typically a low power source typically of 100 mJ operating at between 10 and 30 Hz, say 20 Hz with a 5 MW peak power.

Figure 2:
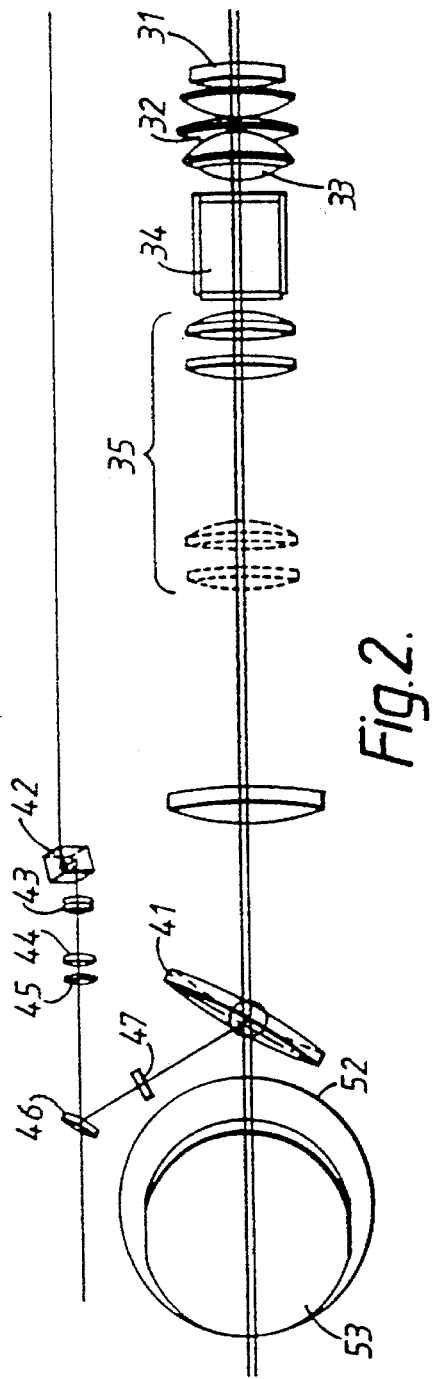
FIGS. 2 and 3 show plan and side views, respectively, of the arrangements of optical components in FIG. 1.
Figure 3:
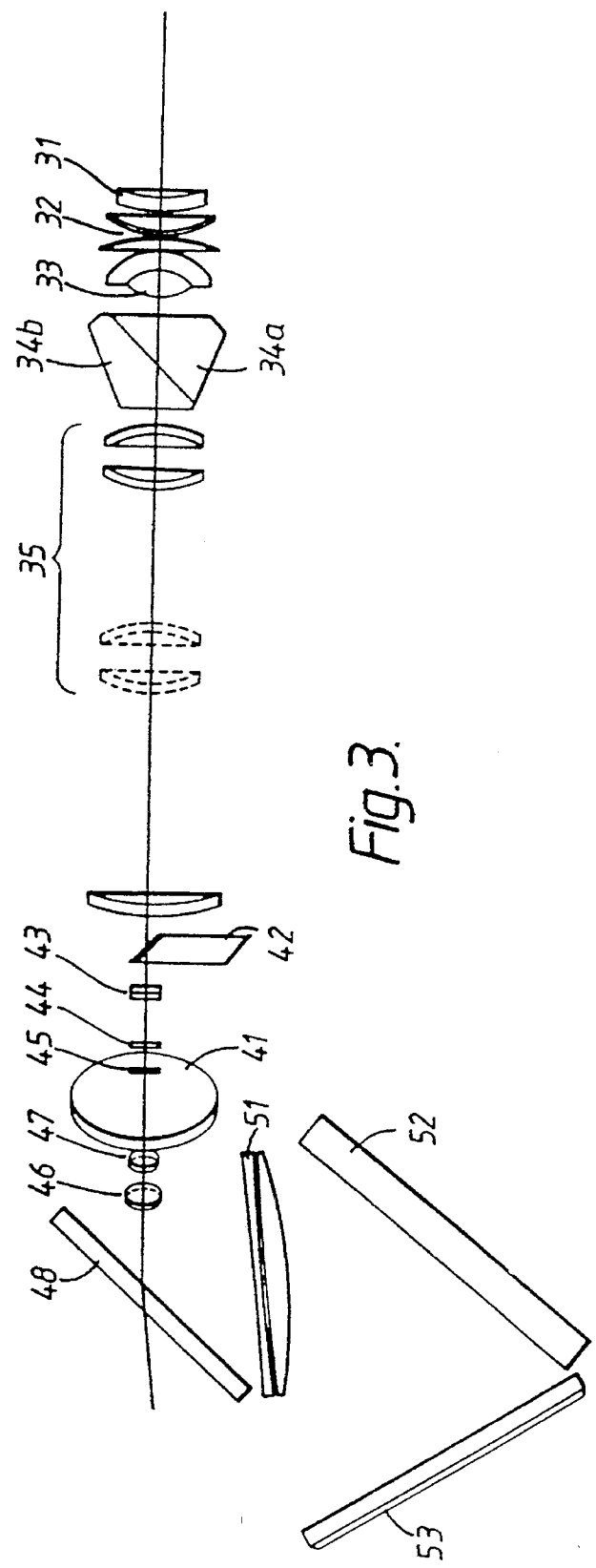

The imager telescope 30, combining optics 40 and objective lens arrangement 50 are shown in more detail in FIGS. 2 and 3. The imager telescope 30 comprises window 31, an eyepiece lens arrangement 32, field lens 33 and a derotation prism arrangement 34. The derotation arrangement 34 comprises a pair of Pechan prisms 34a, 34b, and serves to compensate for the movement of other optical components or the vehicle itself and provide a stable image to the system 10.

The zoom lens, or relay optical, arrangment 35 is provided for the imager telescope 30 and is described in more detail in British Patent Application No: 9011160.0. The zoom lens arrangement 35 allows two fields of view to be obtained when the pairs of lens elements are spaced apart at one of two predetermined positions. The optical path of the imaging system intersects a beam splitter 41 forming part of the combining optics 40.

The Nd: YAG laser output is fed via a periscope 42, a pair of steering wedges 43, an athermalisation lens 44 and a fixed lens 45 to a fold mirror 46 which directs the laser beam to the beam splitter 41 via an adjustable lens 47. The beam splitter 41 is arranged to be transmissive at the imaging system wavelengths, e.g. 8–12 microns or 3–5 microns while reflecting the laser wavelength which are shorter, typically 0.5 to 1.6 microns. Thus both the imaging system and the laser beam have the same optical path from the beam splitter 41. The beams are deflected through substantially 90 degrees by a further fold mirror 48. The fold mirror 48 may be controllable so as to steer and stabilise the sightline.

The combining optics arrangement provides the link between the imaging system, laser and common objective lens arrangement 50. The common lens arrangement comprises an objective lens 51 which is typically made from zinc selenide and zinc sulphide Cleartran or $BaF_2$. It is necessary that the objective lens provides essentially achromatic focusing for the imaging system and provides good transmission of the laser beam. A stablized mirror 52 and a window 53 complete the objective lens arrangement. The window typically has a relatively large aperture, say, of the order of 42% of the overall pod diameter, allowing the imaging system to have an entrance pupil diameter of the order of 42% of the pod diameter.

Because of the size limitations mentioned, especially the narrow pod diameter, it is not possible to position the laser and imaging system in the optimum positions so that, some compromise is required. It is undesirable that the laser path link should be long or involve a large number of optical components so that energy losses can be reduced. The zoom lens arrangement, or relay optical systems, allows the imaging systems to be placed at a considerable distance from the objective lens rearwardly of the laser within the confined housing. Furthermore, the fact that the imaging system is positioned so far away allows the zoom lens to cover the two required fields of view without the optical diameters becoming too large. The zoom lens arrangement is also arranged to minimize the size both of the objective lens and of the deroration prism for both fields of view.

The introduction of the laser beam into the objective lens system between the imaging system and the objective lens allows a much simpler objective lens system to be utilized hence saving space. However, it is necessary to select the material and design of the objective lens to give the achromatic focusing and transmission mentioned above.

Changes can be made while remaining within the scope of the invention. For example, laser wavelengths from about 0.5 to 5 microns may be used. Furthermore a T.V. camera is incorporated in the system by using a small aperture formed in the side of the objective lens. An autobore sighting system may also be incorporated.

We claim:

1. An optical arrangement comprising;
    an infrared imaging system operating in conjunction with a first beam having wavelengths less than 15 microns;
    a coherent infrared source generating a second beam having wavelengths shorter than the first beam wavelengths;
    an objective lens arrangement including an objective lens having a hole formed in one side of the objective lens;
    a partially reflective member located between the objective lens arrangement and the imaging system, and between the objective lens arrangement and the infrared source; and
    a T.V. camera for receiving an image through the objective lens hole,
    wherein the first beam is directed to the imaging system from a region being imaged, and the second beam is directed from the infrared source to the region being imaged, the respective beams being directed to the partially reflective member so that the respective beams pass through the objective lens along substantially the same optical path as each other.

2. An arrangement as claimed in claim 1, wherein the partially reflective member is a beam splitter which transmits the first beam wavelengths, and reflects the second beam wavelengths along said optical path.

3. An arrangement as claimed in claim 1, wherein the objective lens is capable of transmitting radiation from of 0.5 microns to 15 microns.

4. An arrangement as claimed in claim 1, wherein the first beam has wavelengths in a range of 3–5 or 8–12 microns.

5. An arrangement as claimed in claim 1, wherein the second beam has a wavelength of about 1 micron.

6. An arrangement as claimed in claim 1, wherein the objective lens allows achromatic focusing of the first beam wavelengths and transmission of the second beam wavelengths.

7. An arrangement as claimed in claim 1, wherein the coherent source is a Nd:YAG laser.

8. An arrangement as claimed in claim 1, wherein the imaging system includes a zoom lens arrangement to assist in focusing and an optical derotation arrangement to reduce the effect of movement of the apparatus.

9. An arrangement as claimed in claim 8, wherein the optical derotation arrangement comprises a prism.

10. An arrangement as claimed in claim 1, further including a controllable mirror located on one side of the objective lens.

* * * * *